(12) United States Patent
Vandermeijden

(10) Patent No.: US 8,330,474 B2
(45) Date of Patent: Dec. 11, 2012

(54) SENSOR DEVICE AND METHOD WITH AT SURFACE OBJECT SENSING AND AWAY FROM SURFACE OBJECT SENSING

(75) Inventor: Tom R. Vandermeijden, Los Gatos, CA (US)

(73) Assignee: Synaptics Incorporated, Santa Clara, CA (US)

( * ) Notice: Subject to any disclaimer, the term of this patent is extended or adjusted under 35 U.S.C. 154(b) by 408 days.

(21) Appl. No.: 12/368,692

(22) Filed: Feb. 10, 2009

(65) Prior Publication Data

US 2010/0090712 A1    Apr. 15, 2010

Related U.S. Application Data

(60) Provisional application No. 61/105,714, filed on Oct. 15, 2008.

(51) Int. Cl.
*G01R 27/26* (2006.01)
(52) U.S. Cl. .......................... 324/658; 324/679; 345/173
(58) Field of Classification Search .................. 324/658, 324/647, 665, 672
See application file for complete search history.

(56) References Cited

U.S. PATENT DOCUMENTS

| | | | | |
|---|---|---|---|---|
| 5,053,757 | A * | 10/1991 | Meadows | 345/173 |
| 5,412,395 | A * | 5/1995 | Maeda et al. | 345/89 |
| 5,488,430 | A * | 1/1996 | Hong | 348/699 |
| 5,861,875 | A | 1/1999 | Gerpheide | |
| 6,061,051 | A * | 5/2000 | Chan et al. | 345/173 |
| 6,292,173 | B1 * | 9/2001 | Rambaldi et al. | 345/157 |
| 6,323,846 | B1 | 11/2001 | Westerman et al. | |
| 6,904,570 | B2 | 6/2005 | Foote et al. | |
| 6,977,646 | B1 * | 12/2005 | Hauck et al. | 345/173 |
| 7,075,523 | B2 | 7/2006 | Marten et al. | |
| 7,639,238 | B2 * | 12/2009 | Hauck | 345/173 |
| 7,839,393 | B2 * | 11/2010 | Chang | 345/174 |
| 2004/0062420 | A1 * | 4/2004 | Rohaly | 382/107 |

(Continued)

FOREIGN PATENT DOCUMENTS

FR    2896595    7/2007

(Continued)

OTHER PUBLICATIONS

Theremin Sensors Circuity, Andrey Smirnov; [retreived on Apr. 17, 2009] Retrieved from Internet: http://asmir.theremin.ru/tsensors_sch.htm.

(Continued)

*Primary Examiner* — Melissa Koval
*Assistant Examiner* — Feba Pothen
(74) *Attorney, Agent, or Firm* — Ingrassia Fisher & Lorenz P.C.

(57) ABSTRACT

Methods, systems and devices are described for determining positional information for objects using a sensing device. The various embodiments provide improved user interface functionality by facilitating user input with both objects that are at the surfaced and objects that are away from the surface. The sensor device includes a processing system and a sensor array of sensing electrodes adapted to capacitively sense objects in a sensing region. First, the processing system is configured to determine positional information for objects at the surface in a first portion of the sensing region. Secondly, the processing system is configured to determine positional information for objects that are away from the surface and in a second portion of the sensing region, where the first portion of the sensing region is between the surface and the second portion of the sensing region.

30 Claims, 10 Drawing Sheets

U.S. PATENT DOCUMENTS

| | | |
|---|---|---|
| 2006/0161871 A1 | 7/2006 | Hotelling et al. |
| 2006/0187214 A1* | 8/2006 | Gillespie et al. ............. 345/173 |
| 2006/0202969 A1* | 9/2006 | Hauck ........................... 345/173 |
| 2006/0244733 A1 | 11/2006 | Geaghan |
| 2006/0279548 A1 | 12/2006 | Geaghan |
| 2007/0032967 A1 | 2/2007 | Feen et al. |
| 2007/0279395 A1 | 12/2007 | Philipp et al. |
| 2008/0007534 A1 | 1/2008 | Peng et al. |
| 2008/0012835 A1 | 1/2008 | Rimon et al. |
| 2008/0157782 A1 | 7/2008 | Krah |
| 2008/0158172 A1 | 7/2008 | Hotelling et al. |
| 2008/0162996 A1 | 7/2008 | Krah et al. |
| 2008/0246723 A1* | 10/2008 | Baumbach .................... 345/156 |
| 2009/0033343 A1 | 2/2009 | Reynolds et al. |
| 2009/0213081 A1* | 8/2009 | Case, Jr. ........................ 345/173 |

FOREIGN PATENT DOCUMENTS

| | | |
|---|---|---|
| JP | 2008153025 | 7/2008 |

OTHER PUBLICATIONS

International Search Report PCT US2009/059632 dated Jun. 10, 2010.

* cited by examiner

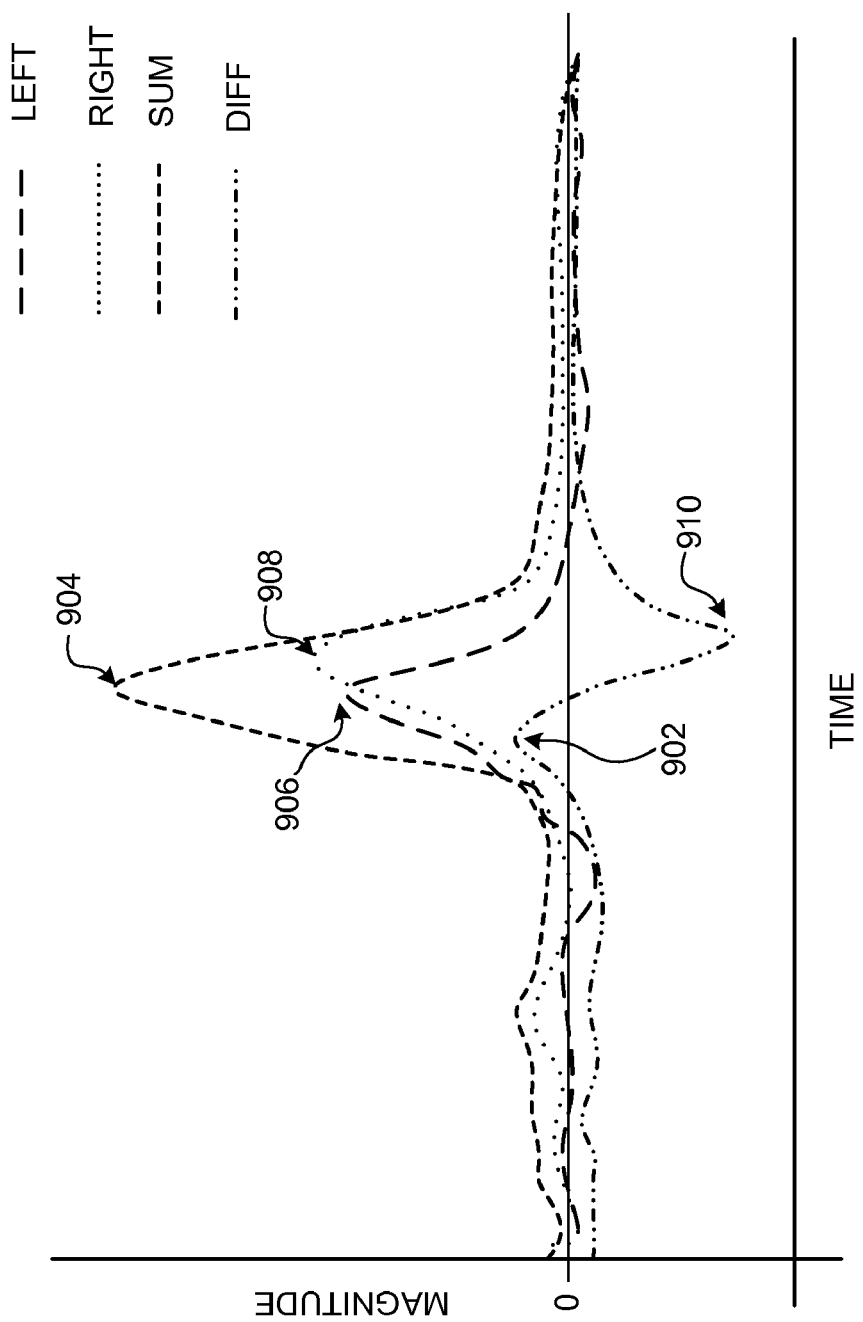

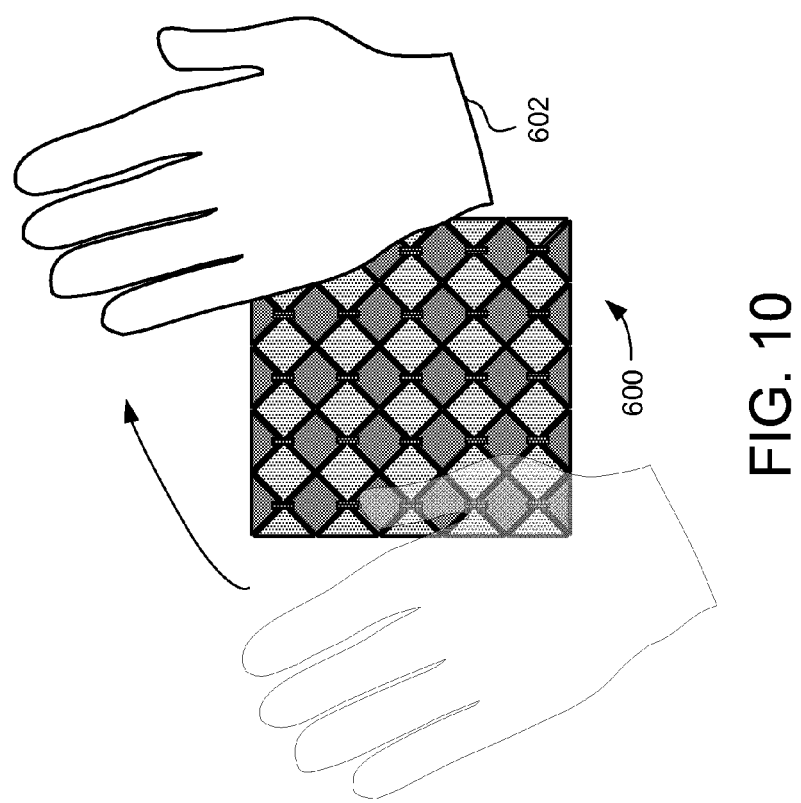

SENSOR DEVICE AND METHOD WITH AT SURFACE OBJECT SENSING AND AWAY FROM SURFACE OBJECT SENSING

PRIORITY DATA

This application claims priority of U.S. Provisional Patent Application Ser. No. 61/105,714, which was filed on Oct. 15, 2008, and is incorporated herein by reference.

FIELD OF THE INVENTION

This invention generally relates to electronic devices, and more specifically relates to sensor devices and using sensor devices for producing user interface inputs.

BACKGROUND OF THE INVENTION

Proximity sensor devices (also commonly called touch sensor devices) are widely used in a variety of electronic systems. A proximity sensor device typically includes a sensing region, often demarked by a surface, in which input objects can be detected. Example input objects include fingers, styli, and the like. The proximity sensor device can utilize one or more sensors based on capacitive, resistive, inductive, optical, acoustic and/or other technology. Further, the proximity sensor device may determine the presence, location and/or motion of a single input object in the sensing region, or of multiple input objects simultaneously in the sensor region.

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

One issue with some past proximity sensor devices is that the sensor devices are limited to receiving input with objects that are at or very near the surface. Specifically, most proximity sensor devices can accurately determine location and/or motion of objects that are either right at the surface, or very near to the surface. However, when the objects are farther away from the surface the device the accuracy degrades, and most devices cannot reliably respond to such objects, and thus simply ignore such objects. This limits the flexibility and usability of the sensor device. Thus, there exists a need for improvements in proximity sensor device that improves device flexibility and usability.

BRIEF SUMMARY OF THE INVENTION

The embodiments of the present invention provide a device and method that facilitates improved device usability. Specifically, the device and method provide improved user interface functionality by facilitating user input with both objects that are at the surfaced and objects that are away from the surface. The sensor device includes a processing system and a sensor array of sensing electrodes adapted to capacitively sense objects in a sensing region. The sensor device is adapted to provide user interface functionality by facilitating data entry responsive to proximate objects, both at the surface and away from the surface.

Specifically, the processing system is configured to determine positional information for objects at the surface in a first portion of the sensing region. This positional information can then be used by the system to provide a wide range of user interface functionality. Secondly, the processing system is configured to determine positional information for objects that are away from the surface and in a second portion of the sensing region, where the first portion of the sensing region is between the surface and the second portion of the sensing region.

By configuring the processing system in this way, the sensor device and method can reliably determine positional information for objects that are away from the surface using the same array of electrodes that are used to determine positional information for objects at the surface. Thus, the sensor device provides increased user interface flexibility.

In another embodiment, the sensor device and method facilitates the determination of positional information for both objects at the surface and away from the surface by providing for separate offsets for the different measurements. Specifically, in this embodiment, the sensor device and method uses a baseline to measure signals associated with each electrode in the array of electrodes. This embodiment facilitates accurate object detection by generating separate sets of measurement offsets from the baseline, with one set used for determining positional information for objects at the surface, and the other set used for determining positional information for objects away from the surface.

BRIEF DESCRIPTION OF DRAWINGS

The preferred exemplary embodiment of the present invention will hereinafter be described in conjunction with the appended drawings, where like designations denote like elements, and:

FIG. 9 is a graphical view of combined measured values, difference values and summation values from an electrode array in accordance with an embodiment of the invention;

FIG. 10 is a schematic views of non-orthogonal object motion above an exemplary electrode array in accordance with an embodiment of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The embodiments of the present invention provide a device and method that facilitates improved device usability. Specifically, the device and method provide improved user interface functionality by facilitating user input with both objects that are at the surface and objects that are away from the surface.

Figure 1:
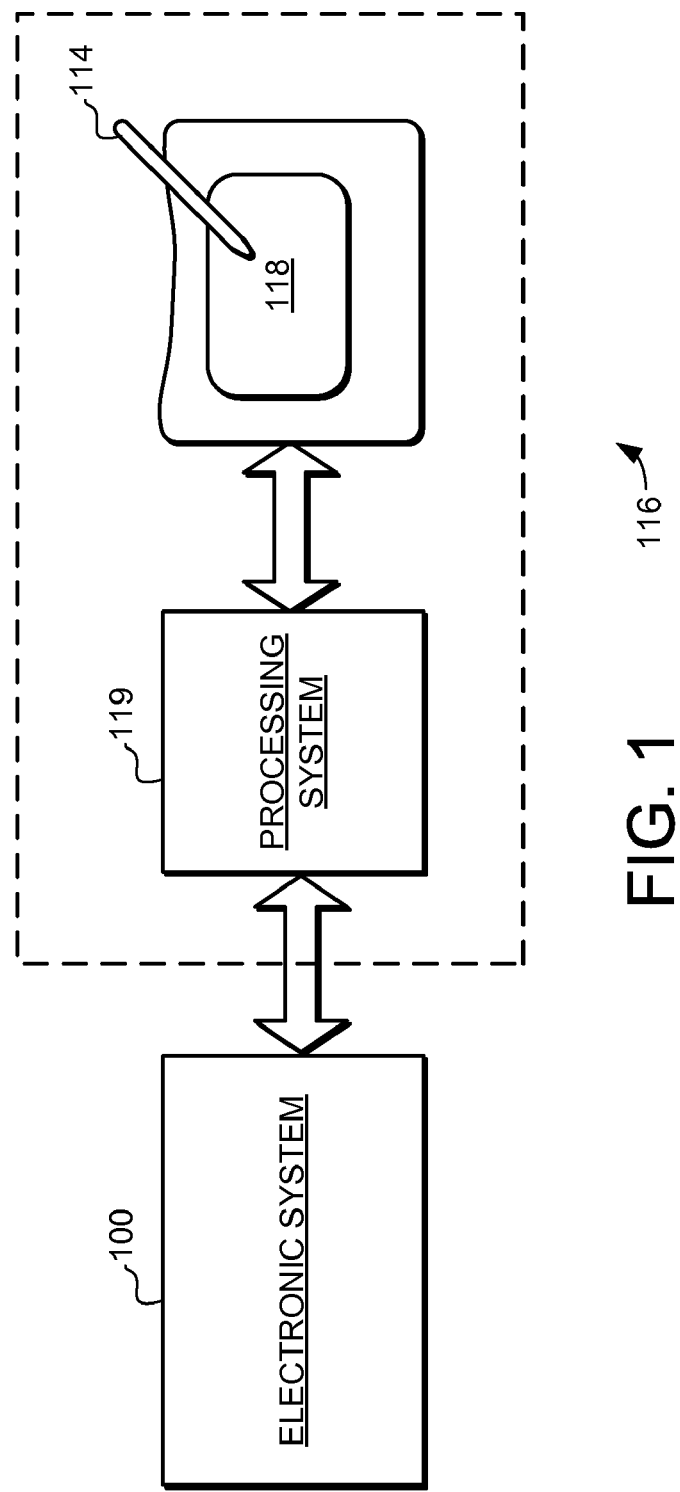
FIG. 1 is a block diagram of an exemplary system that includes a proximity sensor device in accordance with an embodiment of the invention.

Turning now to the drawing figures, FIG. 1 is a block diagram of an exemplary electronic system 100 that operates with a proximity sensor device 116. As will be discussed in greater detail below, the proximity sensor device 116 can be implemented to function as an interface for the electronic system 100. The proximity sensor device 116 has a sensing region 118 and is implemented with a processing system 119. Not shown in FIG. 1 is an array of sensing electrodes that are adapted to capacitively sense objects in the sensing region 118.

The sensor device 116 is adapted to provide user interface functionality by facilitating data entry responsive proximate objects. Specifically, the processing system 119 is configured to determine positional information for objects at the surface in a first portion of the sensing region 118. This positional information can then be used by the system 100 to provide a wide range of user interface functionality. Furthermore, the processing system 119 is configured to determine positional information for objects that are away from the surface and in a second portion of the sensing region 118, where the first portion of the sensing region is between the surface and the second portion of the sensing region.

In one embodiment, the processing system 119 is configured to determine positional information of objects that are away from the surface by determining a measured value for each of the electrodes in the array of sensing electrodes, determining a first combined value from measured values for a first subset of electrodes in the array of sensing electrodes, determining a second combined value from measured values for a second subset of electrodes in the array of sensing electrodes, determining a difference value between the first combined value and the second combined value; and generating positional information for objects away from surface from first combined value, the second combined value, and the difference value.

By configuring the processing system 119 in this way, the sensor device 116 can reliably determine positional information for objects that are away from the surface using the same array of electrodes that are used to determine positional information for objects at the surface. Thus, the sensor device 116 provides increased user interface flexibility.

In another embodiment, the sensor device 116 facilitates the determination of positional information for both objects at the surface and away from the surface by providing for separate offsets for the different measurements. Specifically, in this embodiment, the sensor device 116 uses a baseline to measure signals associated with each electrode in the array of electrodes. To maintain accuracy, the sensor device 116 periodically measures the signals associated with each electrode, and determines an appropriate offset for each electrode, with the offsets selected such that all of the electrodes measure from the same common baseline. These measurements preferably occur when no object is close enough to interfere with the calculation of the offsets. However, these measurements also preferably occur sufficiently often enough to keep the device properly calibrated.

This embodiment facilitates accurate object detection by generating separate sets of measurement offsets, with one set used for determining positional information for objects at the surface, and the other set used for determining positional information for objects away from the surface. In one embodiment, the first set of offsets used for objects at the surface can be updated frequently, while the second set of offsets used for objects away from the surface can be updated less frequently. This is desirable in some applications as the offsets used for the objects away from the surface are typically based on measurements when no object is remotely proximate to the electrodes, while the offsets used for the objects at the surface can be based on measurements that occur when other objects are closer.

Again, by providing separate measurement offsets the sensor device 116 can reliably determine positional information for objects that are away from the surface using the same array of electrodes that are used to determine positional information for objects at the surface.

Returning to FIG. 1, electronic system 100 is meant to represent any type of stationary or portable computer, including workstations, personal digital assistants (PDAs), video game players, communication devices (e.g., wireless phones and messaging devices), media device recorders and players (e.g., televisions, cable boxes, music players, and video players), digital cameras, video cameras, and other devices capable of accepting input from a user and of processing information. Accordingly, the various embodiments of system 100 may include any type of processing system, memory or display. Additionally, the elements of system 100 may communicate via any combination of protocol and connections, including buses, networks or other wired or wireless interconnections. Non-limiting examples of these include I2C, SPI, PS/2, Universal Serial Bus (USB), Bluetooth, RF, IRDA.

The proximity sensor device 116 is sensitive to positional input, such as the position or motion of one or more input objects within the sensing region 118. A stylus 114 is shown in FIG. 1 as an exemplary input object, and other examples include a finger (not shown). "Sensing region" 118 as used herein is intended to broadly encompass any space above, around, in and/or near the proximity sensor device 116 wherein the sensor is able to detect an input object. In a conventional embodiment, sensing region 118 extends from a surface of the proximity sensor device 116 in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions 118 can vary widely from embodiment to embodiment.

Sensing regions with rectangular projected shape are common, and many other shapes are possible. For example, depending on the design of the sensor array and surrounding circuitry, shielding from any input objects, and the like, sensing regions 118 can be made to have two-dimensional projections of other shapes. Similar approaches can be used to define the three-dimensional shape of the sensing region. For example, any combination of sensor design, shielding, signal manipulation, and the like can effectively define a sensing region that a distance in the third dimension (into out of the page) in FIG. 1.

In accordance with the embodiments of the invention, the sensing region is divided into two portions, with the first portion at and near the surface, and the second portion farther away from the surface. This allows the proximity sensor device 116 to determine positional information for both objects at and near the surface, and for objects farther away from the surface.

In operation, the proximity sensor device 116 suitably detects positional information of one or more input objects within sensing region 118 using capacitive sensing techniques. Capacitive sensing techniques are advantageous to ones requiring moving mechanical structures (e.g. mechanical switches) that more easily wear out over time. In a suitable capacitive implementation of the proximity sensor device 116, a voltage or current is applied to create an electric field about a surface. The sensor device 116 would then determine positional information for proximate objects by detecting changes in capacitance reflective of the changes in the electric field due to the object. Examples of technologies that can be used to implement the various embodiments of the invention can be found at U.S. Pat. No. 5,543,591, U.S. Pat. No. 6,259,234 and U.S. Pat. No. 5,815,091, each assigned to Synaptics Inc.

The proximity sensor device 116 can include one or more sensing regions 118 supported by any appropriate proximity sensing technology. For example, the proximity sensor device 116 can use arrays of capacitive sensor electrodes to support any number of sensing regions 118.

The processing system 119 is coupled to the proximity sensor device 116 and the electronic system 100. The processing system 119 can perform a variety of processes on the signals received from the sensor to implement the proximity sensor device 116. For example, the processing system 119 can select or connect individual sensor electrodes, detect presence/proximity, calculate position or motion information, or interpret object motion as gestures.

In some embodiments, the proximity sensor device 116 uses processing system 119 to provide electronic indicia of positional information to the electronic system 100. The system 100 appropriately processes the indicia to accept inputs from the user, to move a cursor or other object on a display, or for any other purpose. In such embodiments, processing system 119 can report positional information to electronic system 100 constantly, when a threshold is reached, or in response some criterion such as an identified stroke of object motion. In other embodiments, the processing system 119 directly processes the indicia to accept inputs from the user, to move a cursor or other object on a display, or for any other purpose based on any number and variety of criteria.

In accordance with embodiments of the invention, the processing system 119 can provide improved user interface functionality by facilitating user input with both objects that are at the surface and objects that are away from the surface. Specifically, the processing system 119 is configured to determine positional information for objects at the surface and in a first portion of the sensing region. This positional information can then be used by the system to provide a wide range of user interface functionality. Furthermore, the processing system 119 is configured to determine positional information for objects that are away from the surface and in a second portion of the sensing region, where the first portion of the sensing region is between the surface and the second portion of the sensing region.

In this specification, the term "processing system" includes any number of processing elements appropriate to perform the recited operations. Thus, the processing system 119 can comprise any number of discrete components, any number of integrated circuits, firmware code, and/or software code—whatever is needed to perform the recited operations. In some embodiments, all processing elements that comprise the processing system 119 are located together, in or near the proximity sensor device 116. In other embodiments, these elements would be physically separated, with some elements of the processing system 119 close to the sensor electrodes, and some elsewhere (such as near other circuitry for the electronic system 100). In this latter embodiment, minimal processing could be performed by the elements near the sensor, and the majority of the processing could be performed by the elements elsewhere.

Furthermore, the processing system 119 can communicate with some part of the electronic system 100, and be physically separate from or physically integrated with that part of the electronic system. For example, the processing system 119 can reside at least partially on a microprocessor for performing functions for the electronic system 100 aside from implementing the proximity sensor device 116.

As used in this application, the terms "electronic system" and "electronic device" broadly refer to any type of device that operates with proximity sensor device 116. The electronic system 100 could thus comprise any type of device or devices in which a proximity sensor device 116 can be implemented in or coupled to. The proximity sensor device 116 thus could be implemented as part of the electronic system 100, or coupled to the electronic system 100 using any suitable technique. As non-limiting examples, the electronic system 100 could thus comprise any type of computing device listed above or another input device (such as a physical keypad or another touch sensor device). In some cases, the electronic system 100 is itself a peripheral to a larger system. For example, the electronic system 100 could be a data input device such as a remote control, or a data output device such as a display system, that communicates with a computing system using a suitable wired or wireless technique. It should also be noted that the various elements (any processors, memory, etc.) of the electronic system 100 could be implemented as part of the proximity sensor device 116, as part of a larger system, or as a combination thereof. Additionally, the electronic system 100 could be a host or a slave to the proximity sensor device 116.

In some embodiments the proximity sensor device 116 is implemented with buttons or other input devices near the sensing region 118. The buttons can be implemented to provide additional input functionality to the proximity sensor device 116. For example, the buttons can be used to facilitate selection of items using the proximity sensor device. Of course, this is just one example of how additional input functionality can be added to the proximity sensor device 116, and in other implementations the proximity sensor device 116 could include alternate or additional input devices, such as physical or virtual switches, or additional proximity sensing regions. Conversely, the proximity sensor device 116 can be implemented with no additional input devices.

Likewise, the positional information determined the processing system 119 can be any suitable indicia of object presence. For example, the processing system 119 can be implemented to determine "zero-dimensional" 1-bit positional information (e.g. near/far or contact/no contact) or "one-dimensional" positional information as a scalar (e.g. position or motion along a sensing region). Processing system 119 can also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processing system 119 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processing system 119 facilitates a full range of interface inputs, including use of the proximity sensor device as a pointing device for cursor control, scrolling, and other functions.

In some embodiments, the proximity sensor device 116 is adapted as part of a touch screen interface. Specifically, the proximity sensor device is combined with a display screen that is overlapped by at least a portion of the sensing region 118. Together the proximity sensor device 116 and the display screen provide a touch screen for interfacing with the electronic system 100. The display screen can be any type of electronic display capable of displaying a visual interface to a user, and can include any type of LED (including organic LED (OLED)), CRT, LCD, plasma, EL or other display technology. When so implemented, the proximity sensor device 116 can be used to activate functions on the electronic system 100, such as by allowing a user to select a function by placing an input object in the sensing region proximate an icon or other user interface element that is associated with or otherwise identifies the function. The user's placement of the object can thus identify the function to the electronic system 100. Likewise, the proximity sensor device 116 can be used to facilitate user interface interactions, such as button functions, scrolling, panning, menu navigation, cursor control, and the like. As another example, the proximity sensor device can be used to facilitate value adjustments, such as by enabling changes to a device parameter. Device parameters can include visual parameters such as color, hue, brightness, and contrast, auditory parameters such as volume, pitch, and intensity, operation parameters such as speed and amplification. In these examples, the proximity sensor device is used to both activate the function and then to perform the adjustment, typically through the use of object motion in the sensing region 118.

It should also be understood that the different parts of the overall device can share physical elements extensively. For example, some display and proximity sensing technologies can utilize the same electrical components for displaying and sensing. One implementation can use an optical sensor array embedded in the TFT structure of LCDs to enable optical proximity sensing through the top glass of the LCDs. Another implementation can use a resistive touch-sensitive mechanical switch into the pixel to enable both display and sensing to be performed by substantially the same structures.

It should also be understood that while the embodiments of the invention are to be described herein the context of a fully functioning proximity sensor device, the mechanisms of the present invention are capable of being distributed as a program product in a variety of forms. For example, the mechanisms of the present invention can be implemented and distributed as a proximity sensor program on computer-readable media. Additionally, the embodiments of the present invention apply equally regardless of the particular type of computer-readable medium used to carry out the distribution. Examples of computer-readable media include: memory sticks/cards/modules and disk drives, which may use flash, optical, magnetic, holographic, or any other storage technology.

Figure 3:
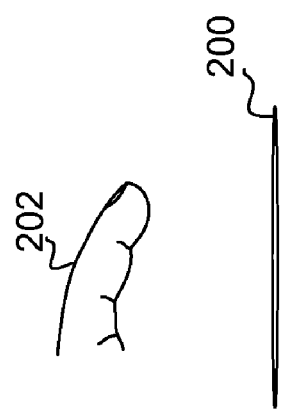
FIG. 3 is a schematic view of an exemplary object away from a sensing surface in accordance with an embodiment of the invention.
Figure 2:
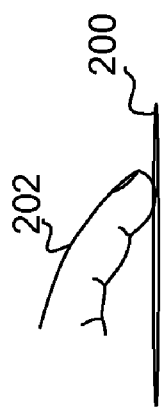
FIG. 2 is a schematic view of an exemplary object at a sensing surface in accordance with an embodiment of the invention.

As noted above, the proximity sensor device is configured to determine positional information for objects that are both at the surface of the sensor and away from the sensor. Turning now to FIGS. 2 and 3, examples of objects at and away from a sensitive surface are illustrated schematically. Specifically, FIG. 2 shows an example of a user's finger 202 at the sensitive surface 200 of a proximity sensor device. Likewise, FIG. 3 shows an example of the user's finger 202 away from the sensitive surface 200. Stated another way, in FIG. 2 the user's finger is in a first portion of the sensing region, while in FIG. 3 the user's finger is the a second portion of the sensing region. In this embodiment, the first portion of the sensing region is between the surface 200 and the second portion of the sensing region.

It should be noted that the location and extent of these first and second portions of the sensing region will depend on the implementation of the sensor device. In general, the first portion is that portion in which the device can accurately determine the position of an object to the extent needed for traditional user input with gestures, such as tap, double tap, drag, etc. In a typical capacitive sensor device, the first portion of the sensing region is that portion that is at or very near the surface 200. The precise extent of the first portion would typically depend upon the shape and arrangement of the electrodes, the thickness and material composition of the various layers, and the techniques used to measure changes the capacitance.

Likewise, the second portion is above first portion, such that the first portion is between the second portion and the surface. The second portion can thus be beyond the range in which the sensor can be used for traditional user input with gestures. However, it should be noted that there is no requirement for any specific or defined boundary between the first and second portions. Instead, it is sufficient that proximity sensor be adapted to determine positional information for objects away from the surface, using the techniques described in greater detail below.

The embodiments of invention can be used to enable a variety of different capabilities on the sensing device. Specifically, it can be used to enable the same sensing device that is used for cursor positioning, scrolling, dragging, and icon selection, and other user input at the surface, to receive input in the form of objects above the surface. As one specific example, a touch screen or other proximity sensor can be adapted to close windows on a desktop, put a computer into sleep mode, or perform some other type of mode switch in response to the user swiping a hand over the sensor. As will be described in greater detail, different actions can be configured to occur in response to swipes in different directions. Additionally, the device can be configured to reject or ignore swipes that are more likely to be inadvertent motions.

As noted above, the embodiments of the invention can be implemented with a variety of different types and arrangements of capacitive sensing electrodes. To name several examples, the capacitive sensing device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the electrodes for both the X and Y sensing can be formed on the same layer. In yet other embodiments, the electrodes can be arranged for sensing in only one direction, e.g., in either the X or the Y direction. In still another embodiment, the electrodes can be arranged to provide positional information in polar coordinates, such as "r" and "θ" as one example. In these embodiments the electrodes themselves are commonly arranged in a circle or other looped shape to provide "θ", with the shapes of individual electrodes used to provide "r".

Also, a variety of different electrode shapes can be used, including electrodes shaped as thin lines, rectangles, diamonds, wedge, etc. Finally, a variety of conductive materials and fabrication techniques can be used to form the electrodes. As one example, the electrodes are formed by the deposition and etching of conductive ink on a substrate.

Figure 4:
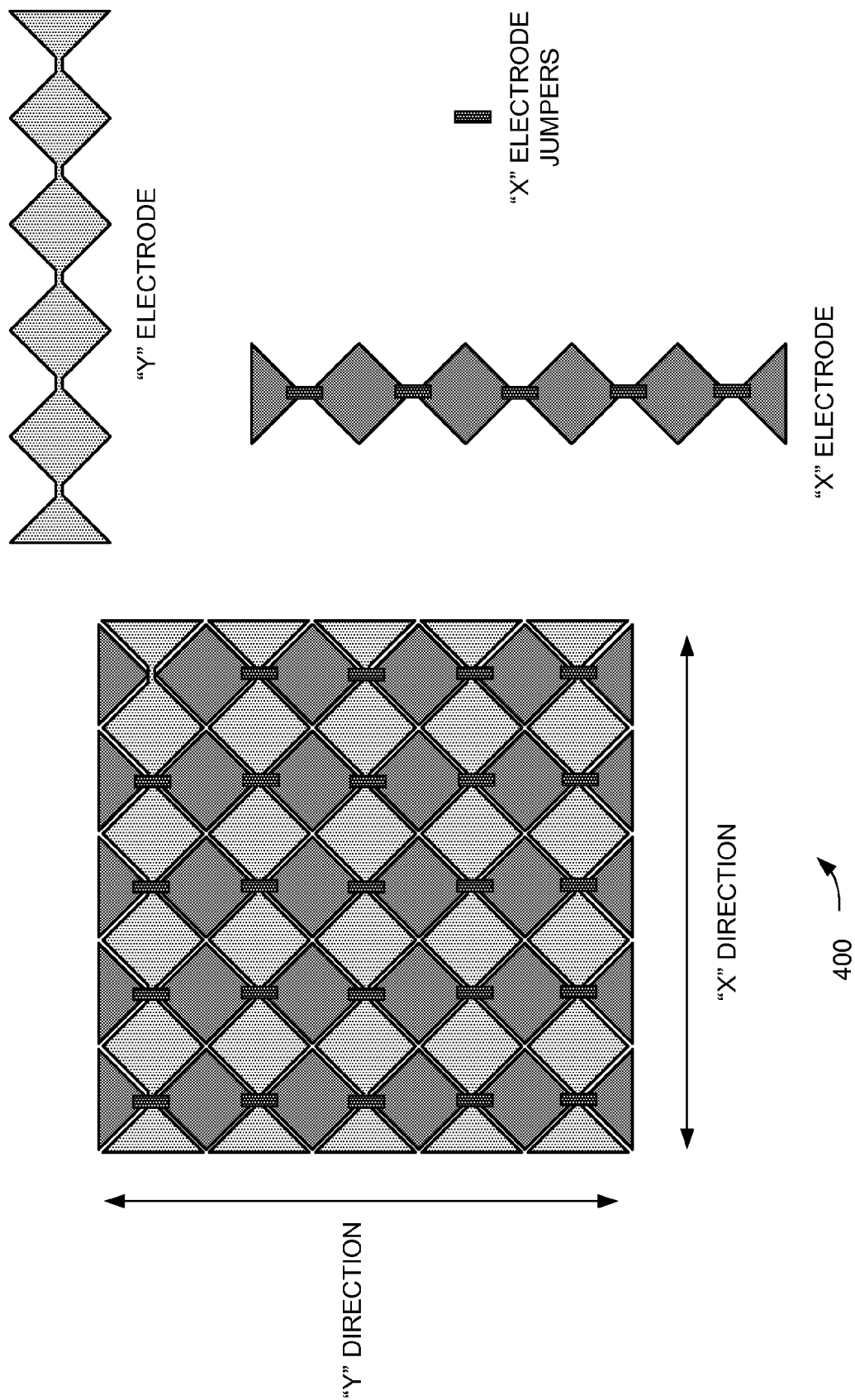
FIG. 4 is a schematic view of an exemplary electrode array in accordance with an embodiment of the invention.

Turning now to FIG. 4, one example of capacitive array of sensing electrodes 400 is illustrated. These are examples of sensing electrodes that are typically arranged to be "under" or on the opposite side of the surface that is to be "touched" by a user of the sensing device. In this example, the electrodes are configured to sense object position and/or motion in the X direction are formed on the same layer with electrodes configured to sense object position and/or motion in the Y direction. These electrodes are formed with "diamond" shapes that are connected together in a string to form individual X and Y electrodes. It should be noted that while the diamonds of the X and Y electrodes are formed on the same substrate layer, a typical implementation will use "jumpers" formed above, on a second layer, to connect one string of diamonds together. So coupled together, each string of jumper connected diamonds comprises one X or one Y electrode.

In the example of FIG. 4, electrode jumpers for X electrodes are illustrated. Specifically, these jumpers connect one vertical string of the diamonds to form one X electrode. The corresponding connections between diamonds in the Y electrode are formed on the same layer and with the diamonds themselves. Such a connection is illustrated in the upper corner of electrodes 400, where one jumper is omitted to show the connection of the underlying Y diamonds. Again, this is just one example of the type of capacitive sensing electrode array that can be used to implement the embodiments of the invention.

Figure 5:
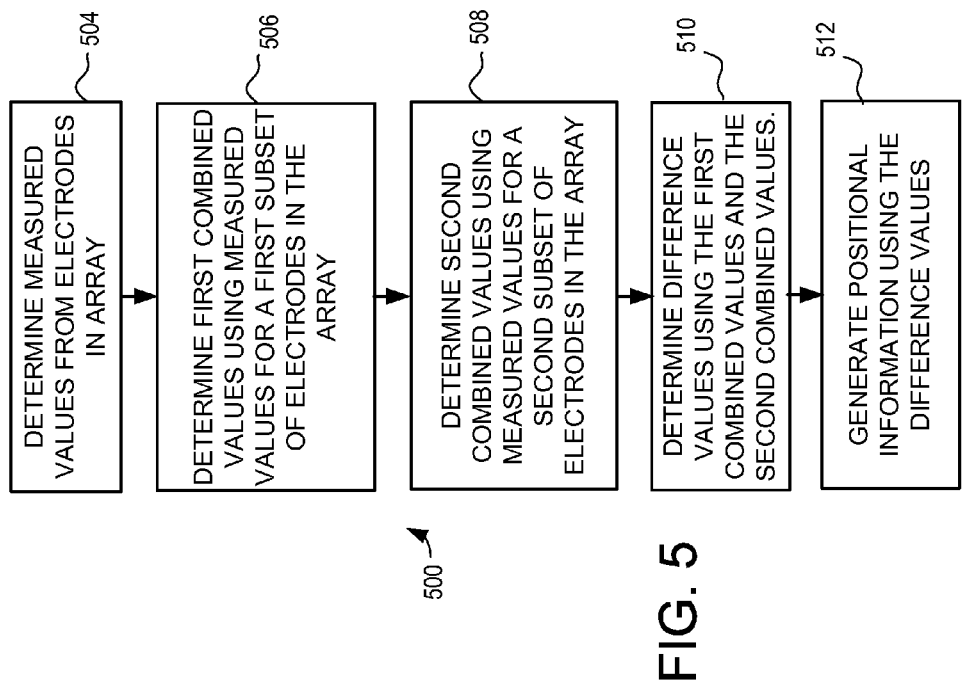
FIG. 5 is a flow diagram of an exemplary method of generating positional information in accordance with an embodiment of the invention.

Turning now to FIG. 5, a method 500 for determining positional information for an object away from a sensing surface is illustrated. As described above, the proximity sensor device is configured to determine positional information for both objects at the surface and away from the surface. In one embodiment, the proximity sensor device is configured to alternatively monitor for both objects at the surface of the sensor device and away from the surface of the sensor device. Then when an object is detected in the sensing region, the device can operate in one of two modes, depending upon whether the object is detected at the surface or away from the surface. In other embodiments, the sensor device operates continuously in both modes and thus is always able to detect and determine the position of objects both at and away from the surface.

The method 500 facilitates the determination of positional information for objects away from the surface by using combinations of measured values taken from subsets of electrodes in the sensing device. This use of the combinations of measured values facilitates the detection and determination of positional information for objects that may otherwise be beyond the range of the sensing device. Thus, the sensor can detect objects at the surface using the electrodes individually, and also can determine positional information for objects away from the surface using combined subsets of electrodes.

The first step 504 is to determine measured values from electrodes in the array of sensing electrodes. In a capacitive sensing device these measured values are an indication of the capacitance detected by a sensing electrode. These measured values can thus be determined using any suitable technique for calculating a capacitance, including a change in capacitance, as measured by an electrode. Furthermore, the measured values can have been subjected to a variety of processing, such as digital and analog filtering. Likewise, these measured values can be expressed in a variety of forms. As one example, the measured values can be expressed in terms of baseline values of measured capacitance. Finally, as will be described in greater detail below, these measured values can be determined using sets of measurement offsets, where the measurement offsets are calculated and used to ensure that each electrode measures from the same baseline value.

The next step 506 is to determine first combined values using measured values from a first subset of electrodes in the array. In general, the use of combined values generated from a subset of electrodes facilitates the determination of positional information from measured values that would be too low if used separately. Stated another way, the generation of combined values effectively uses the subset of electrodes as one larger electrode, with the larger effective electrode able to measure changes in capacitance for objects that would be beyond the effective range of an individual electrode.

These first combined values can be generated using a variety of techniques. For example, relatively straightforward summations of measured values from the first subset can be used. In other embodiments, these summations can be weighted based on electrode position or shape. In still other embodiments the combined values can be based on multiple measurements taken over times. In all these cases however, the combined values are based on the measured values from a first subset of electrodes in the array of electrodes.

The next step 508 is to determine second combined values using measured values from a second subset of electrodes in the array. Again, the use of second combined values facilitates the determination of positional information from measured values that would be too low if used separately. And again, the second combined values can be generated from the measured values using a variety of techniques.

It should also be noted that the electrodes in the first subset of electrodes and second subset of electrodes can be selected in a variety of different ways. For example, the subsets of electrodes can be based on a spatial division of the electrodes under the surface, such that that the first subset corresponds to one area of the surface and the second subset corresponds to another area. In such an embodiment it may be desirable to select the subsets such that each has the same or nearly the same number electrodes. Furthermore, in some embodiments the subsets would be selected such that they do not include any electrodes in common. In other embodiments, the subsets could be selected to include one or more electrodes in common.

It should also be noted that the subsets can be dynamically determined, including changing the subsets based on operational factors during processing. For example, different subsets can be used when different resolutions of positional information are desired. For example, larger numbers of electrodes can be grouped into a subset and the measurements combined when an object is at a greater distance away from the sensing device. Then, when the object moves closer, smaller numbers of electrodes can be grouped into a subset to gain finer positional information for the object.

Furthermore in cases where the sensing region is significantly larger than the objects that are sensed it can be desirable to utilize subsets that cover only a portion of the sensor. The relatively smaller subsets of electrodes can in some cases more accurately determine positional information for smaller objects. For example, in these applications each subset may include less than one quarter of the total number of electrodes in the sensor. This allows the use of multiple subsets of electrodes that, taken together, only cover a portion of the electrodes. Again, this is an example where the subsets would typically be dynamically determined. In this case the subsets could be determined based on the previous position of a sensed object away from the surface.

It should also be noted that in some embodiments it will be desirable to select the first and second subsets from electrodes that are configured in one direction (e.g., the X electrodes) and then generate additional subsets from electrodes configured in the other direction (e.g., the Y electrodes). In these cases, the additional subsets can be used to generate additional combined values, which can then be used to generate additional positional information. Such an embodiment will be described in greater detail below.

The next step 510 is to determine difference values using the first combined values and the second combined values. The difference values can be generated using any comparison of the first and second combined values. In one embodiment, the comparison is performed using a subtraction of combined values. Specifically, a first combined value can be calculated based on a set of measured values taken in one measurement cycle, and a second combined value calculated based on a second set of measured values taken during that measurement cycle. The first combined value is then subtracted from the second combined value to give a difference value for that measurement cycle. This process is repeated, generating difference values for each of the first and second combined values calculated over time. The subtraction can also be weighted in some applications.

It should be noted that this is just one example, and that other comparison techniques could be used to generate the difference values from the first and second combined values. For example, an integration of the combined values can be performed, and the integrated first combined values and integrated second combined values then subtracted to determine the difference values. These techniques effectively compare the area under a portion of the curves for the first and second combined values. Such techniques can use any suitable integration technique, including estimation techniques such as curve fitting. In any case, these techniques tend to average the combined values, and thus can offer increased noise rejection capability.

The next step 512 is to generate positional information using the difference values. It first should be noted that in this specification the phrase "using the difference values" includes techniques that utilize other data in addition to the difference values when determining positional information. Thus, when using the difference values to generate positional information other data, such as the combined values or summation values described below, could also be used with the difference values in making this determination. For example, the extrema of combined values discussed above could also be separately analyzed as part of the using the difference values to determine positional information.

Furthermore, a variety of techniques can be used to generate the positional information from the difference values. As one non-limited example, at least one extremum can be identified in the difference values taken over time. The at least one extremum in the difference values can then be used to generate positional information. These extrema can include both minimums and maximums in the difference values generated over a time period.

In general, the extrema in the difference values can be identified using a suitable analysis technique, including various known peak detection and centroid based procedures. In general, peak detection techniques find local minimums and maximums in data by calculating the "rate of change" or "slope" at different locations in the data. Locations in the data where the rate of change goes from positive to negative usually correspond to local maximums, while locations in the data where the rate of change goes from negative to positive usually correspond to local minimums. Once located, these local minimums and maximums can be further analyzed to locate the extrema at issue. In some cases the located extrema are compared to threshold values, so that only extrema of significant magnitude are located and used. Likewise, centroid procedures locate extrema in data by calculating centroids of the area of under curves and using those centroids to find minimums and maximums in the data. One example of a centroid based technique is found in U.S. Pat. No. 5,880,411, assigned to Synaptics, Inc. Of course, these are just two general examples of how extrema detection can be performed, and any suitable technique that effectively locates extrema in data can be used.

Such techniques can be used to identify a temporal sequence of extremum, including extrema in the difference values and/or the first and second combined values, and that temporal sequence of extremum can then be used to determine positional information of the object. Such a temporal sequence of extrema can be generated from measurements taken from either the "X" or "Y" electrodes, or both, depending upon the specific positional information desired.

As examples, various aspects of velocity (such as the direction and/or speed) for an object moving across the surface can be determined from a temporal sequence of extrema. In one specific case, the direction of such an object can be determined as predominately in one direction or the other (e.g., the X or Y direction) from the temporal order of the extrema. Likewise, a count of extrema in the temporal sequence can be used to determine the number or configuration of objects passing over the sensing region. Additionally, combinations of these difference values, such as summations over time can be calculated and compared to threshold values.

As noted above, in one specific embodiment, the first and second subsets are selected from electrodes in one direction (e.g., the X electrodes illustrated in FIG. 4) and third and fourth subsets are selected from electrodes in the other direction (e.g., the Y electrodes illustrated in FIG. 4). In this embodiment combined values can be generated from these four subsets and used to generate two sets of difference values, one set of difference values for the X electrodes and one set for the Y electrodes. These two sets of difference values can then be used to determine a speed and/or direction for an object moving across the surface. For example, the values from the subsets of X electrodes can be used to determine if motion is occurring in the X direction, while the values from the subsets of Y electrodes can be used to determine if motion is occurring in the Y direction. In either case, the difference values generated from the combined values are used to determine positional information for objects away from the surface.

As noted above, the method 500 utilizes combined values generated from a subset of electrodes to provide the ability to determine positional information for objects that are away from the surface, outside the "regular" range of the sensor. In contrast, for "regular" operation the sensor determines position information for objects at the surface using capacitive measurements from individual electrodes. Specifically, each electrode provides a measurement of capacitance, such as a measurement of change in capacitance between electrodes or between an electrode and an object. These individual measured values can be determined using any suitable technique, and can be subjected to a variety of processing, such as digital and analog filtering.

Positional information for an object at the surface can then be determined from the measured values, using any suitable method, such as the various known peak detection and centroid detection techniques. For example, by locating which electrode corresponds to a peak in the measured values taken from the array electrodes, the location of the object relative to the array can be determined. Thus, the measured values from each electrode are analyzed to determine the position of an object at the surface. This is in contrast to the method 500 described above, where the measured values from subsets of electrodes are combined based on their subset, and then difference values from the combined values are determined and used to generate positional information for objects away from the surface.

Several specific examples of how a proximity sensor device can be configured to determine positional information for an object away from the surface will now be discussed. As stated above, one specific application is to configure a sensor device to determine when an object passes above the sensitive surface of the sensing device, and to further determine the direction of that hand motion. Such a configuration can be utilized to perform a first action in response to the user passing a hand over the sensor in a first direction, and to perform a second action in response to the user passing a hand over the sensor in the second direction.

In one example of how to configure the sensing device in this manner, the electrodes of the sensing device are logically grouped into a "left" subset and a "right" subset. Combined values are generated from the left and right subset of sensor electrodes, and these combined values are used to generate difference values. The processor is configured to analyze extrema in these values to determine positional information for an object away from the surface, and moving across the surface.

Figure 6:
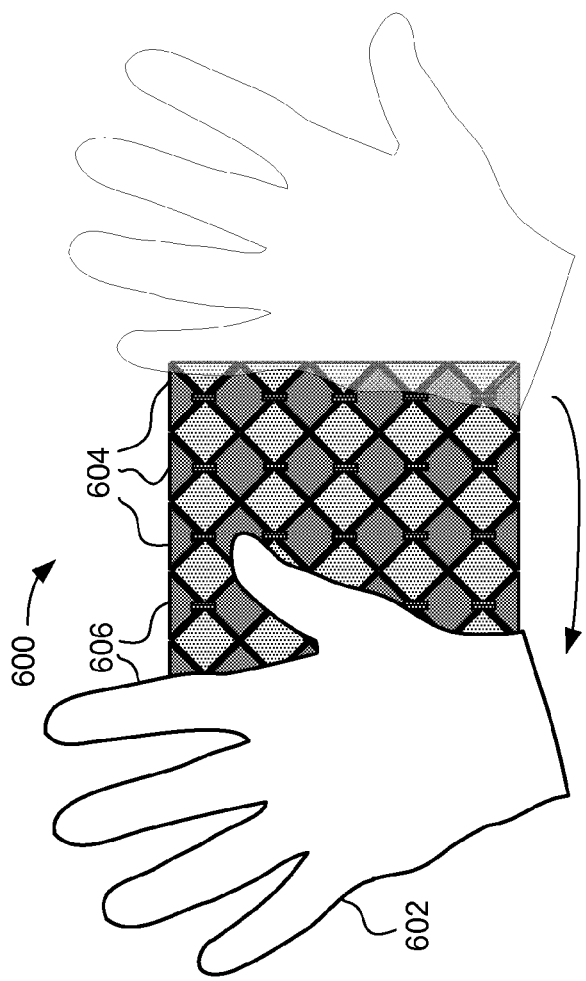

Turning now to FIG. 6, an array of sensing electrodes 600 is illustrated with a hand 602 moving across the surface. Using the directions of FIG. 4, the hand is moving predominately in the X direction. Measurements from subsets of X electrodes can be combined and used to generate difference values, and these difference values used to determine if object motion away from the surface is occurring in the X direction. In this example, one subset of X electrodes could comprise the three rightmost electrodes 604, while a second subset of X electrodes comprises the two leftmost electrodes 606. Of course, this is just one example of how the electrodes can be grouped and measurements combined to determine object motion in the X direction.

Figure 7:
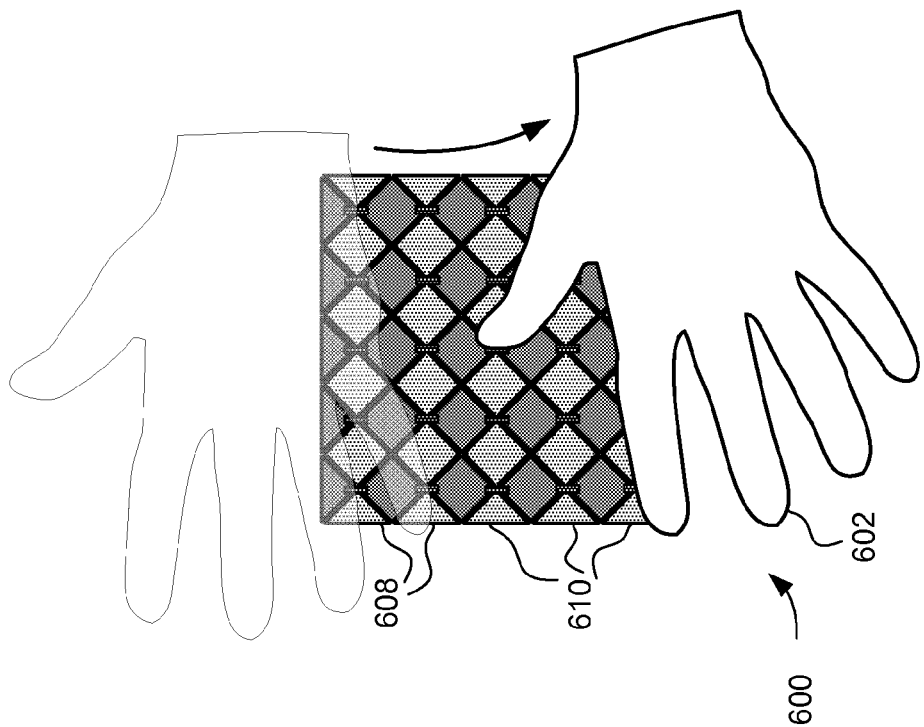
FIGS. 6-7 are schematic views of object motion above an exemplary electrode array in accordance with an embodiment of the invention.

Likewise, measurements from subsets of Y electrodes can be combined and used to generate difference values, and these difference values used to determine if object motion away from the surface is occurring in the Y direction. An example of such motion is illustrated in FIG. 7. In this example, one subset of Y electrodes could comprise the top two electrodes 608, while a second subset of Y electrodes comprises the bottom three electrodes 610. Again, this is just one example of how the electrodes can be grouped and measurements combined to determine object motion in the X direction.

Figure 8:
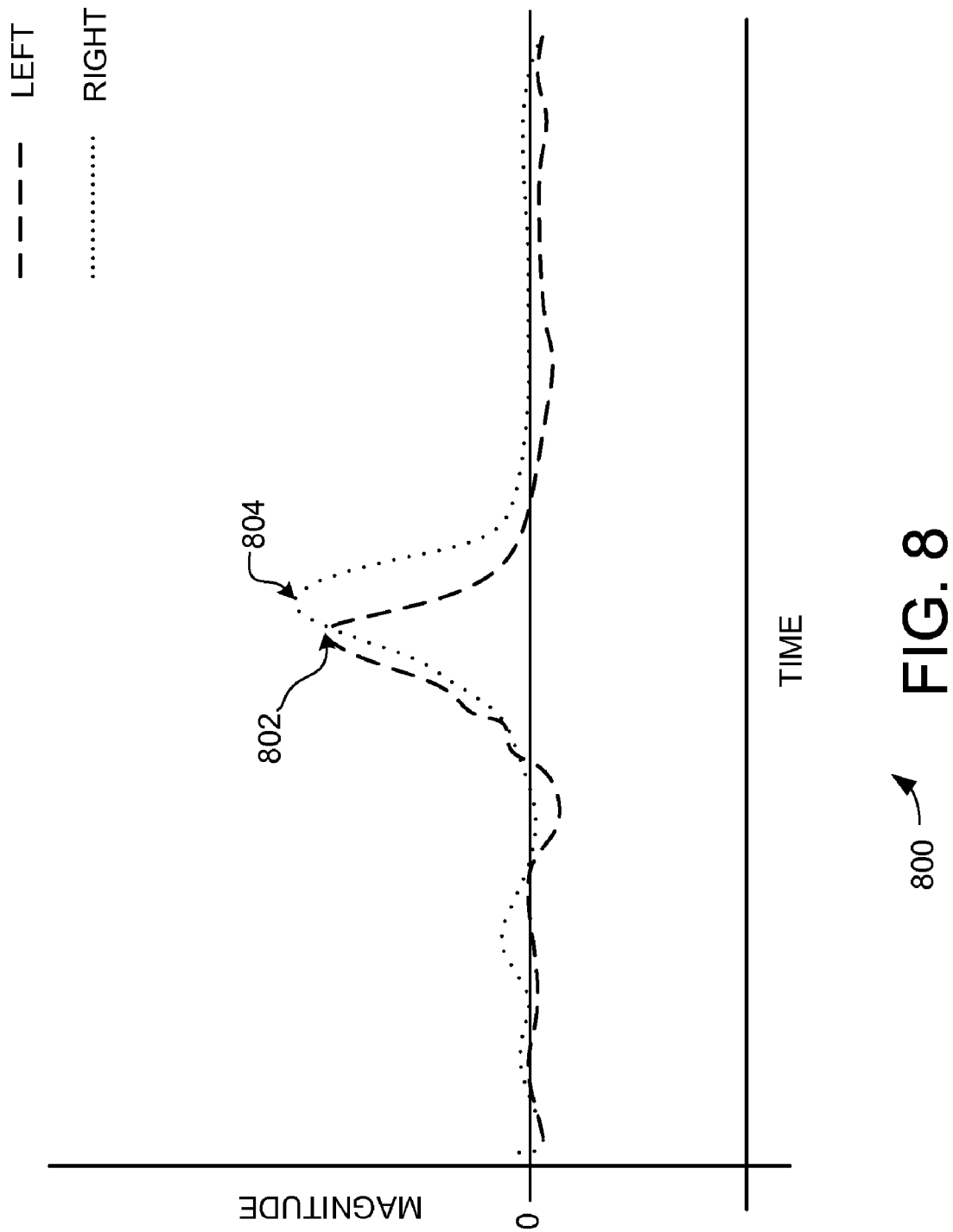
FIG. 8 is a graphical view of combined measured values from an electrode array in accordance with an embodiment of the invention.

Turning now to FIG. 8, a graph 800 illustrates an example of combined and difference values taken from the proximity sensor, and illustrates how they can be used to determine that an object has passed over the sensor, and used to determine the direction of the object when passing over. In this example, the "LEFT" waveform is comprised of summation values of the left subset of electrodes, and the "RIGHT" waveform is comprised summation values of the right subset of electrodes.

One technique for using these values is to compare extrema in the left and right combined values. This technique uses a suitable peak detection or centroid procedure to temporally locate the extrema in both the left and right combined values, and in some cases compare those located extrema to threshold values to insure that only significant extrema are used. As can be seen in FIG. 8, the combined values for RIGHT and LEFT electrodes include various significant extrema, and the temporal order of these extrema can be used to determine the direction of object passing over the sensing region.

For example, if a local peak occurs in the left combined values, followed by a local peak in the right combined values, then left-to-right motion is detected. This is illustrated in FIG. 8, as the peak 802 in the LEFT occurs before the peak 804 in RIGHT. Conversely, if a peak occurs in the right combined values, followed by a peak in the left combined values, then right-to-left motion is detected. This technique can thus determine the direction of an object passing above the sensor by determining the order of extrema in the combined values. However, while this simple technique provides for the determination of the direction of motion, it is susceptible to the effects of noise in the measured. Such noise can interfere with the reliable detection of peaks in the combined value, and thus limit the reliability of the determination.

A more robust technique is to evaluate a temporal sequence of extrema that include both combined and difference values. Turning now to FIG. 9, a graph 900 illustrates an example of combined and difference values taken from the proximity sensor, and illustrates how they can be used to determine that an object has passed over the sensor, and determine the direction of the object when passing over. Again, the "LEFT" waveform is comprised of summation values of the left subset of electrodes, and the "RIGHT" waveform is comprised summation values of the right subset of electrodes. The "DIFF" waveform is comprised difference values between "LEFT" and "RIGHT" summation values, and the "SUM" waveform is comprised of the sum of left and right combined values—and thus a sum of all measured values.

Again, each of these waveforms has significant extrema that can be determined and the temporal sequence used to determine object motion. In one specific example, if a determined temporal sequence comprises a local maximum in the difference values, followed by a local maximum in the summation of the combined values, followed by a local minimum of the difference values, then a left-to-right motion can be determined with high confidence. This temporal sequence of extrema is illustrated in FIG. 9, where a maximum 902 in the DIFF value occurs first, followed by a maximum 904 in the SUM values, a maximum 906 in the LEFT values, a maximum 908 in the RIGHT values, and a minimum 910 in the difference values.

Conversely, if a determined temporal sequence comprises a minimum in the difference values, followed by a maximum in the summation of the combined values, followed by a maximum of the difference values, then right-to-left motion can be determined with high confidence. It should also be noted that the same procedure can be used on measurements from the Y electrodes to distinguish between up-to-down object motion and down-to-up object motion.

In this embodiment, the use of the difference values and summation values can make the determination of motion direction more robust than that illustrated in FIG. 8. Specifically, noise in the measurements can sometimes lead to combined values that mimic object motion. However, the detected presence of difference values and summation values above a threshold level reliably indicates that the combined values are from actual detected objects. Thus, the motion of the object can be more reliably detected by comparing the extrema in the difference and/or summation values to corresponding threshold values.

An alternate procedure is to require only one extrema of significant magnitude in the difference values to determine the motion. This would compensate for situations where the other extrema in the difference values is missing or difficult to detect due to noise, where the lack of the other extrema would otherwise result in the motion not being determined.

In addition to evaluating the temporal order of extrema, positional information can also be determined using the relative magnitudes of the extrema. Specifically, the relative maximums of difference values from the X electrodes and difference values from the Y electrodes can be used to determine direction. This determination of direction can go beyond simply distinguishing between left-to-right and right-to-left motion. This determination can be used to identify motions that cross the surface at substantially non-orthogonal directions to the electrodes. An example of a non-orthogonal object motion is illustrated in FIG. 10. The ability to distinguish non-orthogonal object motion from object motion in the X or Y directions can be used to initiate additional actions in response to these motions. Alternatively, such ability can be used to "reject" such motions (such that action that would occur with a left-to-right or up-to-down motion is not performed). This can be helpful in avoiding the inadvertent activation of those actions that could otherwise occur.

One technique for determining when the object motion is non-orthogonal is to compare the relative maximums of the difference values from the X electrodes and difference values from the Y electrodes can be used to determine direction. Specifically, when the motion of the object across the surface is substantially orthogonal to the X or Y direction, then the extrema in the difference values for the X or Y electrodes will have significant differences in magnitude. When the difference values for the X electrodes have extrema with significantly higher magnitude than the Y electrodes, then direction can be determined to be predominately in the X direction. Conversely, when the difference values for the Y electrodes have extrema with significantly higher magnitude, then the direction can be determined to be predominately in the Y direction. Thus, this technique can be used to distinguish between X direction object motion as illustrated in FIG. 6, and Y direction object motion as illustrated in FIG. 7.

Conversely, when the difference values for the X and Y electrodes have extrema that are relatively close, then the direction can be determined to be substantially non-orthogonal. Thus, close values can be used to determine when non-orthogonal object motion occurs, such object motion illustrated in FIG. 10. Again, the determination that motion is substantially non-orthogonal can be used to activate different functions or reject the input as likely inadvertent.

Figure 12:
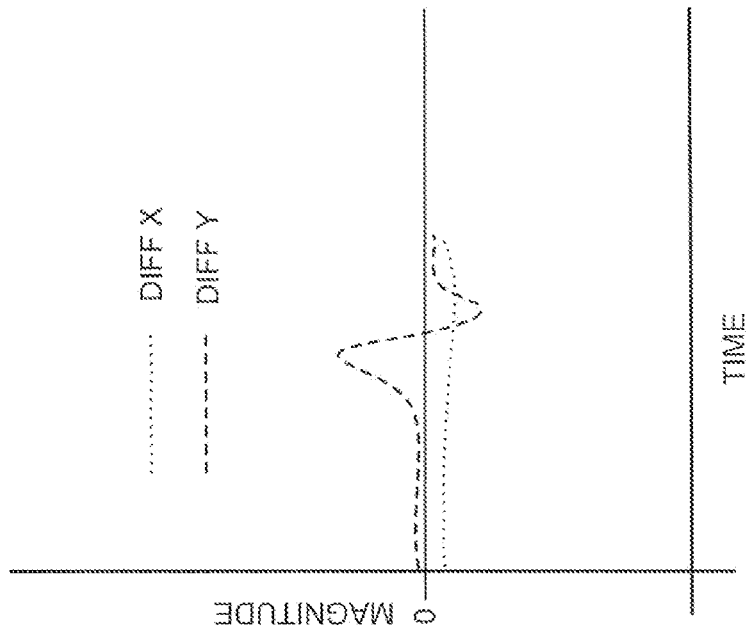
FIGS. 11-14 are graphical views of difference values from an electrode array in accordance with an embodiment of the invention.
Figure 11:
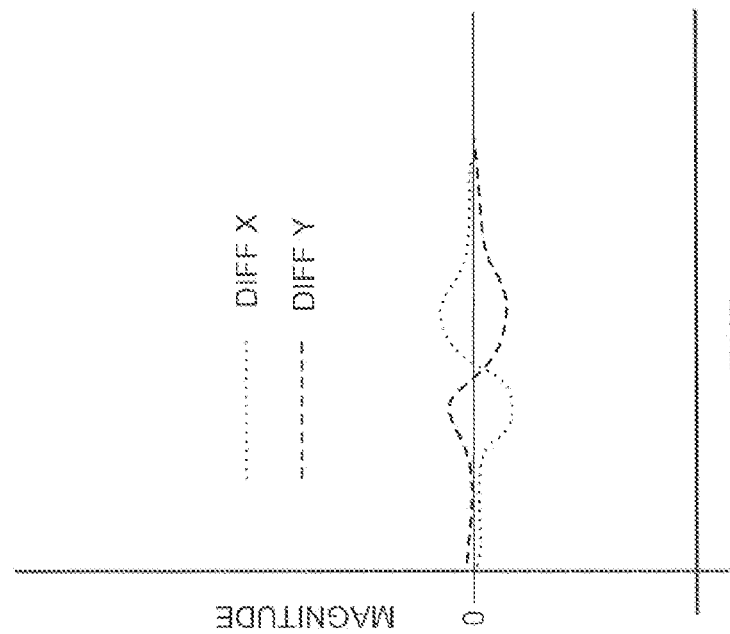

Turning now to FIGS. 11 and 12, graphs 1100 and 1200 illustrate examples of difference values from X and Y electrodes, and illustrate how the relative magnitudes of the difference values can be used to determine when an object is moving in a substantially non-orthogonal direction. Specifically, the graphs 1100 and 1200 illustrate difference values for X electrodes (DIFF X) and Y electrodes (DIFF Y) at two instances in time. The graph 1100 includes difference values that have a first set of extrema. The graph 1200 includes difference values that have a second set of extrema. In graph 1100, the difference values for both X and Y electrodes both have significant magnitude (where magnitude can be defined as the absolute value of the extrema, for example, as measured from 0, or as measured using the number of positive rate increases and negative decreases in a waveform). Stated another way, the magnitude of the DIFF X extrema values is a significant percentage of the magnitude of the DIFF Y extrema values over the same time period. This indicates object motion that is substantially non-orthogonal to the directions of the X and Y electrodes.

In contrast, in graph 1200 the extrema have a very significant magnitude in the DIFF Y values, but a very low magnitude in DIFF X values. This indicates a substantially orthogonal motion across the sensor in the X direction. Thus, by comparing the extrema magnitudes of the difference values for X and Y electrodes, it can be determined that object motion is either predominately in the X or Y direction, or is instead predominately non-orthogonal to the electrodes.

In a variation on these embodiments, the proximity sensor device can also determine when an object is instead moving predominately from above and toward the surface. Specifically, when an object approaches the sensor from above, significant combined values will result, but no significant extrema of difference values will be generated. Thus, when a hand approaches from above the SUM values waveform could still be rather large in magnitude, signaling that an input object is close and within proximity. However, the DIFF X values waveform could be approximately zero since the input object would cover the touchpad equally and is not moving in the X direction. Thus, by comparing the magnitude of extrema in the difference values to a threshold, it can be determined if the object is approaching from above.

Again, such ability can be used to "reject" such motions, and again can be useful in avoiding inadvertent activation of those actions that could otherwise occur. It should be noted that there are trade-offs in establishing when detected motion should be rejected. If the criteria are too strict then some intended motions may not always be recognized. If the criteria are more relaxed then unintended motions may be recognized. In some applications it may be desirable to provide different levels of criteria that may be selectable by the user to tailor the response.

In another embodiment, the sensor device can be adapted to distinguish other characteristics of an object moving across the sensing region. For example, the sensor can be adapted to distinguish between a hand held as a flat palm, with all fingers together, and one having the fingers split apart or having fingers from more than one hand. Specifically, the presence of additional extrema in the difference values can indicate when the fingers are spread apart. Thus, by searching for a significant double peak, a "split V" configuration of the fingers can be determined. Likewise, spreading of all four fingers can be determined by identifying more peaks.

Figure 14:
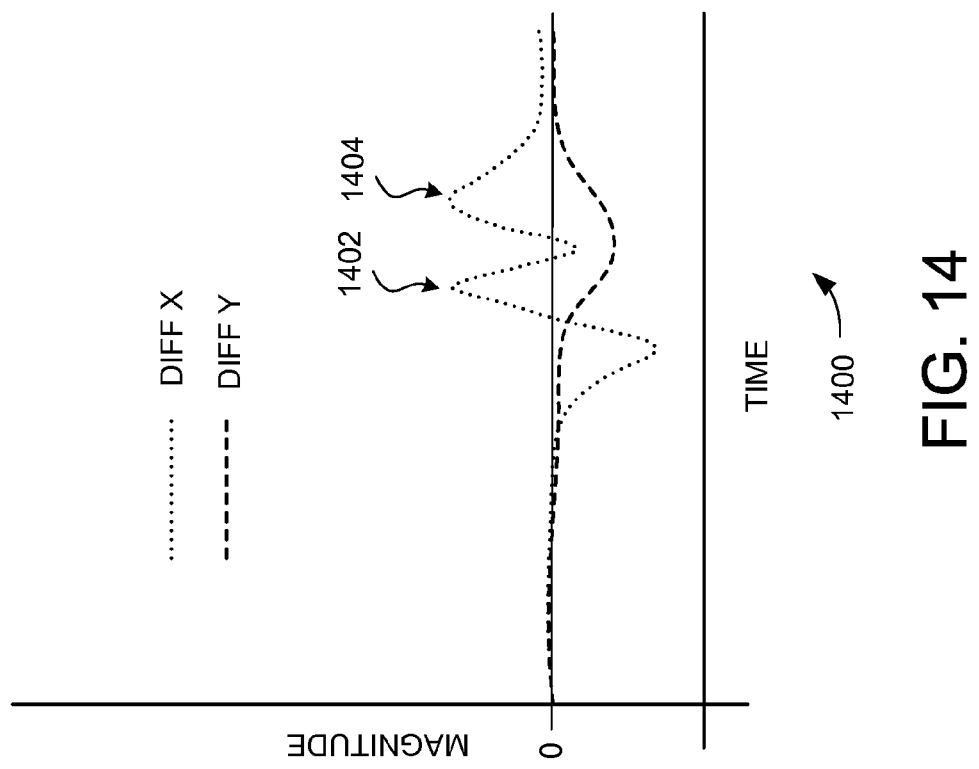
Figure 13:
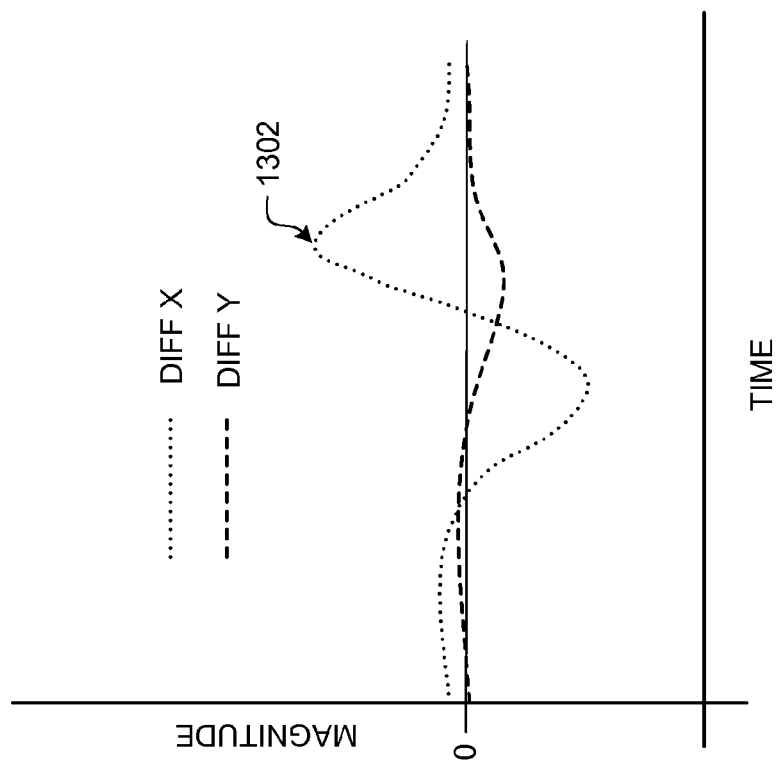

Turning now to FIGS. 13 and 14, graphs 1300 and 1400 illustrate examples of combined and difference values from a proximity sensor, and illustrates how they can be used to determine a characteristic of an object moving across the sensing region. Specifically, graph 1300 shows an example of a temporal sequence of extrema that occurs when a hand is moved across the sensor in a flat palm, fingers together configuration. This sequence includes one peak 1302 in the difference values for the X electrodes. Conversely, graph 1400 shows an example of a temporal sequence of extrema that occurs when a hand is moved across the sensor with the fingers in the "split V" configuration. In graph 1400, there are two positive peaks in the difference values for the X electrodes, with a second positive peak 1404 occurring shortly after the first positive peak 1402. The presence of two positive peaks in the DIFF X values indicates the presence of the split V configuration of fingers, with the hand moving in the X direction, as each group of fingers creates one such peak.

In such an application the proximity sensor could distinguish between the flat palm, the split V and other hand positions and input configurations to enable a variety of different responses on the device.

In another embodiment, the positional information determined from the difference values can comprise one or more aspects of velocity. Specifically, the proximity sensor can be configured to determine the velocity of the object moving across the surface. This velocity can be determined as the velocity in a particular direction (e.g., the X or Y component of velocity). Specifically, in one embodiment, by calculating the time between extrema in the difference values, the corresponding component of the velocity can be estimated.

A detailed example of a technique for determining position information for an object away from the surface will now be discussed. In this example, combined values are generated from measurements for both X and Y electrodes. From the combined values both difference values and summation values are determined and used for positional information determination.

In this example, there are an N number of X electrodes that are subdivided into two subsets, a first subset with an A number of electrodes, and a second subset with an N–A number of electrodes. With these subsets of electrodes so defined, a first combined value COM_$X_{SUB1}$ can be defined as:

$$\text{COM\_}X_{SUB1} = \sum_{i=1}^{A} (X_i - XB_i). \tag{1}$$

Where $X_i$ is the measured value from the $i^{th}$ X electrode, and $XB_i$ is the baseline value of the $i^{th}$ X electrode. This results in the first combined value COM_$X_{SUB1}$ being the sum of the measured values for X electrodes 1 to A. Likewise, a second combined value COM_$X_{SUB2}$ can be defined as:

$$\text{COM\_}X_{SUB2} = \sum_{i=A+1}^{N} (X_i - XB_i). \tag{2}$$

This likewise results in the second combined value COM_$X_{SUB2}$ being the sum of the measured values for X electrodes A+1 to N.

Similarly, there are an M number of Y electrodes that are subdivided into two subsets, a first subset with a B number of electrodes, and a second subset with an M–B number of electrodes. With these subsets of electrodes so defined, a first combined value COM_$Y_{SUB1}$ can be defined as:

$$\text{COM\_}Y_{SUB1} = \sum_{i=1}^{B} (Y_i - YB_i). \tag{3}$$

Where $Y_i$ is the measured value from the $i^{th}$ Y electrode, and $YB_i$ is the baseline value of the $i^{th}$ Y electrode. This results in the first combined value COM_$Y_{SUB1}$ being the sum of the measured values for Y electrodes 1 to B. Likewise, a second combined value COM_$Y_{SUB2}$ can be defined as:

$$\text{COM\_}Y_{SUB2} = \sum_{i=B+1}^{M} (Y_i - YB_i). \tag{4}$$

This likewise results in the second combined value COM_$Y_{SUB2}$ being the sum of the measured values for electrodes B+1 to M. It should be noted in this example that there may be more than N X electrodes and M Y electrodes in the sensor. In that case, all electrodes are not contained in one of the subsets.

With first and second combined values determine from two subsets for both the X and Y electrodes, difference values can be determined. As one example, the difference values DIFF_X for the X electrodes, and DIFF_Y for the Y electrodes can be defined as:

$$\text{DIFF\_}X = \text{COM\_}X_{SUB1} - \text{COM\_}X_{SUB2} \tag{5.}$$

$$\text{DIFF\_}Y = \text{COM\_}Y_{SUB1} - \text{COM\_}Y_{SUB2} \tag{6.}$$

This example determines the difference values as subtractions between the combined values for the X and Y electrode subsets. Similarly, summation values for X and Y electrodes SUM_X and SUM_Y can be defined as $$\text{SUM\_}X = \text{COM\_}X_{SUB1} + \text{COM\_}X_{SUB2} \tag{7.}$$

$$\text{SUM\_}Y = \text{COM\_}Y_{SUB1} + \text{COM\_}Y_{SUB2} \tag{8.}$$

Finally, summation values for all electrodes in the subsets can be defined as:

$$\text{SUM\_}XY = \text{SUM\_}X + \text{SUM\_}Y \tag{9.}$$

So defined, the difference values and summation values can be used to generate positional information for objects away from the surface. Again, this can be done by evaluating temporal sequences in extrema, including extrema in combined values, difference values, and/or summation values, as illustrated in the examples of FIGS. 9, 11, 12 13 and 14 discussed above.

As noted above, the sensor electrodes can be grouped into subsets using a variety of techniques. In some cases, the sensor electrodes can be dynamically grouped to achieve a better combined measurement values. For example, a large grouping of channels can be used to sense an object at a greater distance but with coarser position, while smaller groups can be used to sense object with a finger position, but at a smaller distance than the larger groups.

The sensor electrodes can also be statically grouped, for example, two groups that have substantially the same number of electrodes can be created. In another embodiments a vast majority of the sensor electrodes can grouped into one group or into a plurality of smaller groups having a predetermined number of sensor electrodes. For example, a grouping of three sensor electrodes can be used, where each group of sensor electrodes can have an electrode that is also included in neighboring groupings. Such a grouping of sensor electrodes can used to determine positional information beyond what is done with a more limited number of subsets. Again, in some cases it will be desirable to dynamically group the electrodes such that as an object moves from a greater distance to closer to the sensing surface smaller groupings can be applied for greater precision in determining the location of the input.

As one specific example, the subsets can be dynamically defined such that a plurality of subsets is created, each with three adjacent electrodes, and where the subsets logically overlap. Each subset will thus have three electrodes, and each electrode will reside in three subsets. This results in a reuse of measurement data from the electrodes, and facilities the extraction of data that could otherwise be hidden by noise, and can provide for finer precision in locating an object away from the surface. In addition to being used to generate difference values as described above, these dynamically created and used subsets can facilitate the determination of absolute position of objects away from the surface, and the resulting position can be applied in various ways.

For example, the detection of the object away from the surface can be used to cause an image to be formed directly below the current position of the object. This image above the current location can help the user guide the object to the intended location on the touch screen. For example to guide a user to a particular displayed element on the touch screen. It should be noted that the use of three electrodes in each subset is only one example, and that larger subsets can be used to resolve larger objects at greater distances from the surface.

As described above, in one embodiment the sensor device facilitates the determination of positional information for both objects at the surface and away from the surface by providing for separate offsets for the different measurements. A typical capacitive sensor uses a baseline to measure signals associated with each electrode in the array of electrodes. To maintain accuracy, the sensor device periodically measures the signals associated with each electrode, and determines an appropriate offset for each electrode, with the offsets selected such that all of the electrodes measure from the same common baseline. These measurements preferably occur when no object is close enough to interfere with the calculation of the offsets. However, these measurements also preferably occur sufficiently often enough to keep the device properly calibrated.

The proximity sensor device can be implemented to facilitate accurate object detection in each sensor region by generating separate sets of measurement offsets, with one set used for determining positional information for objects at the surface, and the other set used for determining positional information for objects away from the surface. Typically, the first set of offsets used for objects at the surface can be updated frequently, while the second set of offsets used for objects away from the surface can be updated less frequently. This is desirable in some applications as the offsets used for the objects away from the surface are typically based on measurements when no object is remotely proximate to the electrodes, while the offsets used for the objects at the surface can be based on measurements that occur when other objects are closer.

For example, if both sets of measurement offsets were calculated while an input object is within the second portion of the sensing region, the baseline created may become too low to properly detect an object as it moves through the second portion of the sensing region. Therefore, it is desirable to calculate the measurement offset for the second portion of the sensing region when objects are both away from the surface and not remotely proximate to the electrodes.

Thus, by providing separate measurement offsets the sensor device can reliably determine positional information for objects that are away from the surface using the same array of electrodes that are used to determine positional information for objects at the surface.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A sensor device comprising:
a first array of sensing electrodes under a surface and configured to capacitively sense objects in a sensing region;
a processing system coupled to the first array of sensing electrodes, the processing system configured to:
determine positional information for an object at the surface and in a first portion of the sensing region; and
determine positional information for an object away from the surface and in a second portion of the sensing region, wherein the first portion of the sensing region is between the surface and the second portion, by:
determining measured values, the measured values comprising a measured value for each electrode in the first array of sensing electrodes;
determining first combined values using the measured values for a first subset of electrodes in the first array of sensing electrodes, where the first subset of electrodes includes at least two electrodes in the first array of sensing electrodes;
determining second combined values using the measured values for a second subset of electrodes in the first array of sensing electrodes, where the second subset of electrodes includes at least two electrodes in the first array of sensing electrodes;
determining difference values using the first combined values and the second combined values, each of the difference values based at least in part on a difference between at least one of the first combined values and at least one of the second combined values; and
generating positional information for the object away from surface using the difference values.

2. The sensor device of claim 1 wherein the positional information for the object away from the surface comprises at least one a speed and a direction for object motion parallel to the surface.

3. The sensor device of claim 1 wherein the positional information for the object away from the surface comprises positional information of a plurality of fingers.

4. The sensor device of claim 1 wherein the processing system is configured to generate positional information for the object away from surface using the difference values by determining a temporal sequence of extrema, the extrema including at least one extremum of the difference values.

5. The sensor device of claim 4 wherein the temporal sequence of extrema includes an extremum of measured values preceded by a first extremum of the difference values and followed by a second extremum of the difference values.

6. The sensor device of claim 4 wherein the processing system is configured to generate positional information for the object away from the surface by determining at least one aspect of a velocity of the object away from the surface using a temporal difference in the temporal sequence of extrema.

7. The sensor device of claim 1 further comprising a second array of sensing electrodes under the surface and configured to capacitively sense objects in the sensing region, the second array of sensing electrodes arranged in a different direction from the first array of sensing electrodes, wherein the processing system is further configured to generate positional information for the object away from surface by:

determining second measured values, the second measured values comprising a measured value for each electrode in the second array of sensing electrodes;

determining third combined values using the second measured values for a first subset of electrodes in the second array of sensing electrodes;

determining fourth combined values using the second measured values for a second subset of electrodes in the second array of sensing electrodes; and determining second difference values for the second array of sensing electrodes, the second difference values determined using the third combined values from the second measured values and the fourth combined values from the second measured values such that each of the second difference values are based at least in part on a difference between at least one of the third combined values and at least one of the fourth combined values, wherein the positional information for the object away from the surface comprises at least one of a speed and a direction generated using the first difference values and the second difference values.

8. The sensor device of claim 7 wherein the at least one of a speed and a direction is determined using a comparison of at least one extremum of the first difference values with at least one extremum of the second difference values.

9. The sensor device of claim 1 wherein the first subset of electrodes and the second subset of electrodes do not include any electrodes in common.

10. The sensor device of claim 1 wherein the first subset of electrodes and the second subset of electrodes include at least one electrode in common.

11. The sensor device of claim 1 wherein the first subset of electrodes and the second subset of electrodes are dynamically determined.

12. The sensor device of claim 1 wherein the processing system is further configured to:

determine a first set of measurement offsets, the first set of measurement offsets comprising a plurality of measurement offsets, each of the first set of measurement offsets corresponding to an electrode in the first array of sensing electrodes; and determine a second set of measurement offsets, the second set of measurement offsets comprising a plurality of measurement offsets, each of the second set of measurement offsets corresponding to an electrode in the first array of sensing electrodes, wherein the processing system is configured to determine positional information for the object at the surface using first set of measurement offsets, and wherein the processing system is configured to determine positional information for the object away from the surface using the second set of measurement offsets.

13. A method of determining positional information for objects with a first array of sensing electrodes under a surface, the first array the method comprising:

determining positional information for an object at the surface and in a first portion of the sensing region with a first process; and determining positional information for an object away from the surface and in a second portion of the sensing region with a second process, wherein the first portion of the sensing region is between the surface and the second portion, and wherein the second process comprises:

determining measured values, the measured values comprising a measured value for each electrode in the first array of sensing electrodes;

determining first combined values using the measured values for a first subset of electrodes in the first array of sensing electrodes, where the first subset of electrodes includes at least two electrodes in the first array of sensing electrodes;

determining second combined values using the measured values for a second subset of electrodes in the first array of sensing electrodes, where the second subset of electrodes includes at least two electrodes in the second array of sensing electrodes;

determining difference values using the first combined values and the second combined values, each of the difference values based at least in part on a difference between at least one of the first combined values and at least one of the second combined values; and generating positional information for the object away from surface using the difference values.

14. The method of claim 13 wherein the positional information for the object away from the surface comprises at least one a speed and a direction for object motion parallel to the surface.

15. The method of claim 13 wherein the positional information for the object away from the surface comprises positional information of a plurality of fingers.

16. The method of claim 13 wherein the step of generating positional information for the object away from surface using the difference values comprises determining a temporal sequence of extrema, the extrema including at least one extremum of the difference values.

17. The method of claim 16 wherein the temporal sequence of extrema includes an extremum of measured values preceded by a first extremum of the difference values and followed by a second extremum of the difference values.

18. The method of claim 16 wherein the step of generating positional information for the object away from the surface comprises using a temporal difference in the temporal sequence of extrema to determine at least one aspect of a velocity of the object away from the surface.

19. The method of claim 13 wherein a second array of sensing electrodes are provided under the surface and are configured to capacitively sense objects in the sensing region, the second array of sensing electrodes arranged in a different direction from the first array of sensing electrodes, and wherein the step of generating positional information for the object away from surface further comprises:

determining second measured values, the second measured values comprising a measured value for each electrode in the second array of sensing electrodes;

determining third combined values using the second measured values for a first subset of electrodes in the second array of sensing electrodes, where the first subset of electrodes in the second array of sensing electrodes includes at least two electrodes;

determining fourth combined values using the second measured values for a second subset of electrodes in the second array of sensing electrodes, where the second subset of electrodes in the second array of sensing electrodes includes at least two electrodes;

determining second difference values for the second array of sensing electrodes, the second difference values determined using the third combined values from the second measured values and the fourth combined values from the second measured values, each of the second difference values based at least in part on a difference between at least one of the third combined values and at least one of the fourth combined values; and wherein the positional information for the object away from the surface comprises at least one of a speed and a direction generated using the first difference values and the second difference values.

20. The method of claim 19 wherein the at least one of a speed and a direction is determined using a comparison of at least one extremum of the first difference values with at least one extremum of the second difference values.

21. The method of claim 13 wherein the first subset of electrodes and the second subset of electrodes do not include any electrodes in common.

22. The method of claim 13 wherein the first subset of electrodes and the second subset of electrodes include at least one electrode in common.

23. The method of claim 13 further comprising:
dynamically determining which electrodes comprise the first subset of electrodes; and
dynamically determining which electrodes comprise the second subset of electrodes.

24. The method of claim 13 further comprising the steps of:
determining a first set of measurement offsets, each of the first set of measurement offsets corresponding to an electrode in the array of sensing electrodes, wherein the step of determining positional information for the object at the surface comprises using first set of measurement offsets; and
determining a second set of measurement offsets, each of the second set of measurement offsets corresponding to an electrode in the array of sensing electrodes, wherein the step of determining positional information for the object away from the surface comprises using the second set of measurement offsets.

25. A program product, comprising:
A) a proximity sensor program, the proximity sensor program configured to:
determine positional information for an object at a surface and in a first portion of a sensing region, the surface above a first array of sensing electrodes; and
determine positional information for an object away from the surface and in a second portion of the sensing region, wherein the first portion of the sensing region is between the surface and the second portion, by:
determining measured values, the measured values comprising a measured value for each electrode in the first array of sensing electrodes;
determining first combined values using the measured values for a first subset of electrodes in the first array of sensing electrodes, where the first subset of electrodes includes at least two electrodes in the first array of sensing electrodes;
determining second combined values using the measured values for a second subset of electrodes in the first array of sensing electrodes, where the second subset of electrodes includes at least two electrodes in the first array of sensing electrodes;
determining difference values using the first combined values and the second combined values, each of the difference values based at least in part on a difference between at least one of the first combined values and at least one of the second combined values; and
generating positional information for the object away from surface using the difference values; and
B) non-transitory computer-readable media bearing the proximity sensor program.

26. An sensor device comprising:
an array of sensing electrodes under a surface and configured to capacitively sense objects in a sensing region; and
a processing system coupled to the array of sensing electrodes, the processing system configured to:
determine positional information for an object at the surface and in a first portion of the sensing region by:
determining a first set of measurement offsets, the first set of measurement offsets comprising a plurality of measurement offsets, each of the first set of measurement offsets corresponding to an electrode in the array of sensing electrodes; and
determining positional information for the object at the surface using the first set of measurement offsets;
determine positional information for an object away from the surface and in a second portion of the sensing region, wherein the first portion of the sensing region is between the surface and the second portion, by:
determining a second set of measurement offsets, the second set of measurement offsets comprising a plurality of measurement offsets, each of the second set of measurement offsets corresponding to an electrode in the array of sensing electrodes;
determining a measured value for each electrode in the array of sensing electrodes using a corresponding measurement offset in the second set of measurement offsets;
determining first combined values from measured values for a first subset of electrodes in the array of sensing electrodes, where the first subset of electrodes includes at least two electrodes in the array of sensing electrodes;
determining second combined values from measured values for a second subset of electrodes in the array of sensing electrodes, where the second subset of electrodes includes at least two electrodes in the array of sensing electrodes;
determining difference values using the first combined values and the second combined values, each of the difference values based at least in part on a difference between at least one of the first combined values and at least one of the second combined values; and
generating the positional information for the object away from surface using the difference values.

27. The sensor device of claim 26 wherein the processing system is configured to determine the first set of measurement offsets based on a first set of conditions, and to determine the second set of measurement offsets based on a second set of conditions, where the first set of conditions is different then the second set of conditions.

28. The sensor device of claim 26 wherein the processing system is configured to determine the first set of measurement offsets based on signals taken with the array of sensing electrodes even if objects are in the second portion of the sensing region, and wherein the processing system is configured to determine the second set of measurement offsets based on signals taken with the array of sensing electrodes only when no object is detected in the first portion of the sensing region and the second portion of the sensing region.

29. The sensor device of claim 26 wherein the processing system is configured to determine positional information for the object away from the surface using the second set of measurement offsets by adjusting measurements taken with electrodes in the array of sensing electrodes with corresponding measurement offsets in the second set of measurement offsets.

30. The sensor device of claim 26 wherein the processing system is configured to generate positional information for the objects away from the surface using the second set of measurement offsets by determining at least one of a speed and a direction for object motion parallel to the surface.

* * * * *